United States Patent
Asano et al.

(10) Patent No.: US 10,866,732 B2
(45) Date of Patent: Dec. 15, 2020

(54) NAMESPACE RE-SIZING

(71) Applicant: Toshiba Memory Corporation, Tokyo (JP)

(72) Inventors: Shigehiro Asano, Tokyo (JP); Julien Margetts, Thame (GB); Philip David Rose, Islip (GB)

(73) Assignee: Toshiba Memory Corporation, Tokyo (JP)

( * ) Notice: Subject to any disclaimer, the term of this patent is extended or adjusted under 35 U.S.C. 154(b) by 68 days.

(21) Appl. No.: 15/455,467

(22) Filed: Mar. 10, 2017

(65) Prior Publication Data

US 2018/0260334 A1 Sep. 13, 2018

(51) Int. Cl.
*G06F 3/06* (2006.01)
*G06F 12/02* (2006.01)

(52) U.S. Cl.
CPC .......... *G06F 3/0604* (2013.01); *G06F 3/0631* (2013.01); *G06F 3/0644* (2013.01); *G06F 3/0679* (2013.01); *G06F 12/0246* (2013.01); G06F 2212/1041 (2013.01); G06F 2212/7201 (2013.01)

(58) Field of Classification Search
CPC .................................................. G06F 3/0644
See application file for complete search history.

(56) References Cited

U.S. PATENT DOCUMENTS

| | | | |
|---|---|---|---|
| 7,752,417 B2 | 7/2010 | Manczak et al. | |
| 8,190,741 B2 | 5/2012 | Wong et al. | |
| 8,495,111 B1* | 7/2013 | Wang | G06F 3/0604 707/823 |
| 8,954,658 B1* | 2/2015 | Asnaashari | G06F 3/0604 711/103 |
| 9,218,294 B1 | 12/2015 | Patil et al. | |
| 9,330,105 B1* | 5/2016 | Duprey | G06F 17/30153 |
| 2007/0186074 A1 | 8/2007 | Bradford et al. | |
| 2008/0147964 A1* | 6/2008 | Chow | G06F 21/32 711/103 |
| 2016/0342463 A1 | 11/2016 | Oshima | |
| 2017/0024137 A1 | 1/2017 | Kanno | |
| 2017/0351431 A1* | 12/2017 | Dewitt | G06F 3/0605 |
| 2018/0081574 A1* | 3/2018 | Nagatani | G06F 3/0619 |
| 2018/0189174 A1* | 7/2018 | Chou | G06F 12/0246 |
| 2018/0239697 A1* | 8/2018 | Huang | G06F 12/0246 |

OTHER PUBLICATIONS

Ma et al. "A Survey of Address Translation Technologies for Flash Memories." Jan. 2014. ACM. ACM Computing Surveys. vol. 46. Article 36.*

* cited by examiner

*Primary Examiner* — Nathan Sadler
(74) *Attorney, Agent, or Firm* — White & Case LLP (57) ABSTRACT

A data storage device capable of namespace re-sizing comprises a nonvolatile semiconductor storage device containing data accessed via a logical address that includes a namespace identifier and a logical block address, and a controller. The storage device can convert the namespace identifier to a base address using a first look up table. The storage device can further convert the logical block address to namespace allocation units of storage. The storage device can also determine a pointer using the base address, the namespace allocation units, and a second look up table. Further, the storage device can determine a full logical cluster address using the pointer.

20 Claims, 11 Drawing Sheets

NAMESPACE RE-SIZING

FIELD OF THE INVENTION

The present disclosure relates to solid-state drives and methods that increase the flexibility of operation of the device by enabling re-sizing of logical address namespaces.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

Writing data to and reading data from the physical memory cells of SSDs typically involves shuffling data between various memory cells. Despite this data shuffling, SSDs are able to present consistent, unchanging memory addresses to host systems by using logical-to-physical address translation mechanisms. Hosts use logical addresses, rather than physical addresses, to access data stored in the SSD. The translation mechanisms effectively obscure the shuffling and management of the memory cells so that a host system does not need to account for such operations.

A relatively recent standard for accessing data stored in SSDs, the NVMe™ ("nonvolatile memory express") standard, specifies that data stored in an SSD may be logically divided into resizable chunks referred to as namespaces. A logical address for accessing SSDs that implement namespaces includes a namespace identifier as well as an address within that namespace. While seemingly complex, the NVMe™ standard for SSDs allow for high speed operation. However there remains a long felt need to enhance flexibility of namespaces for re-sizing as the hosts requirements change.

SUMMARY OF INVENTION

The present disclosure relates to a data storage device comprising a nonvolatile semiconductor storage device containing data accessed via a logical address that includes a namespace identifier and a logical block address; and a controller. The controller is configured to convert the namespace identifier to a base address using a first look up table. The controller is also configured to convert the logical block address to namespace allocation units of storage. The controller then determines a pointer using the base address, the namespace allocation units, and a second look up table. Lastly the controller determines a full logical cluster address using the pointer.

According to one implementation, the controller is further configured to define a plurality of allocation units of storage addressed by the logical cluster address. The controller then allocates a subset of the plurality of units of storage to a namespace associated with the namespace identifier. Further, the controller adds a set of entries to the second look up table containing the namespace identifier and a pointer to the logical cluster address for each of the subset of the plurality of units of storage.

In some implementations, the controller is also configured to increase the size of the namespace associated with a namespace identifier by (i) allocating additional allocation units to that namespace identifier, (ii) adding, for each of the additional allocation units, a new entry to the end of the second look up table, the new entry containing the namespace identifier and a logical pointer to the logical cluster address of the additional unit of storage, and (iii) re-ordering the entries in the second look up table such that the new entry is contiguous with the set of entries containing the same namespace identifier.

In other implementations, the controller is configured to determine a physical address within the nonvolatile semiconductor storage device based on a full logical cluster address to physical address mapping table.

In certain implementations, the first look up table comprises internal base addresses which are indexed by namespace identifiers.

According to some implementations, the logical block address comprises a first portion and a second portion, and wherein the base address is formed using the first portion of the logical block address, and the logical cluster address is formed using the second portion of the logical block address.

In some implementations, the controller is further configured to (i) define a plurality of units of storage addressed by the first portion of the logical block address, (ii) allocate a subset of the plurality of units of storage to a namespace associated with the namespace identifier, and (iii) add a set of entries to the second look up table containing the namespace identifier and the first portion of the logical cluster address for each of the subset of the plurality of units of storage.

In certain implementations, the controller is also configured to (i) increase the size of the namespace associated with the namespace identifier by allocating additional units of storage from the plurality of units of storage, (ii) add, for each of the additional units of storage, a new entry to the end of the second look up table, the new entry containing the namespace identifier and the first portion of the logical cluster address of the additional unit of storage; and (iii) re-order the entries in the second look up table to ensure the new entry is contiguous with the set of entries containing the same namespace identifier.

According to some implementations, the controller is further configured to decrease the size of the namespace associated with a namespace identifier by deleting the last entry in the second look up table containing the namespace identifier and the pointer associated with the namespace identifier.

A second aspect of the present disclosure relates to a method comprising converting, by a controller, a namespace identifier to a base address using a first look up table, the namespace identifier associated with a logical address allocated to data for a nonvolatile semiconductor storage device. The method also comprises converting a logical block address associated with the logical address to namespace allocation units of storage. Further, the method comprises determining a pointer using the base address, the namespace allocation units, and a second look up table. The method further comprises determining a full logical cluster address using the pointer.

According to some implementations, the method also comprises allocating, by the controller, a subset of a plurality of units of storage to a namespace associated with the namespace identifier, wherein the controller defines the plurality of allocation units of storage addressed by the logical cluster address. The method further comprises adding, by the controller, a set of entries to the second look up table containing the namespace identifier and a pointer to the logical cluster address for each of the subset of the plurality of units of storage.

In some implementations, the method comprises increasing the size of the namespace associated with a namespace identifier by (i) allocating additional allocation units to the namespace identifier, (ii) adding, for each of the additional allocation units, a new entry to the end of the second look up table, the new entry containing the namespace identifier and a logical pointer to the logical cluster address of the additional unit of storage, and (iii) re-ordering the entries in the second look up table such that the new entry is contiguous with the set of entries containing the same namespace identifier.

In other implementations, the method comprises determining a physical address within the nonvolatile semiconductor storage device based on a full logical cluster address to physical address mapping table.

According to some implementations, the method also comprises defining a plurality of units of storage addressed by a first portion of the logical block address, wherein the logical block address comprises the first portion and a second portion, and wherein the base address is formed using the first portion of the logical block address, and the logical cluster address is formed using the second portion of the logical block address. The method further comprises allocating a subset of the plurality of units of storage to a namespace associated with the namespace identifier. Additionally, the method comprises adding a set of entries to the second look up table containing the namespace identifier and the first portion of the logical cluster address for each of the subset of the plurality of units of storage.

In certain implementations, the method further comprises, when the controller is further configured to increase the size of the namespace associated with the namespace identifier by allocating additional units of storage from the plurality of units of storage (i) adding, for each of the additional units of storage, a new entry to the end of the second look up table, the new entry containing the namespace identifier and the first portion of the logical cluster address of the additional unit of storage, and (ii) re-ordering the entries in the second look up table to ensure the new entry is contiguous with the set of entries containing the same namespace identifier.

In other implementations, the method comprises decreasing the size of the namespace associated with a namespace identifier by deleting the last entry in the second look up table containing the namespace identifier and the pointer associated with the namespace identifier.

A third aspect of the present disclosure relates to a non-transitory computer-readable medium storing instructions that, when executed by a processor, cause the processor to perform a method comprising (i) converting, by a controller, a namespace identifier to a base address using a first look up table, the namespace identifier associated with a logical address allocated to data for a nonvolatile semiconductor storage device, (ii) converting a logical block address associated with the logical address to namespace allocation units of storage, (iii) determining a pointer using the base address, the namespace allocation units, and a second look up table, and (iv) determining a full logical cluster address using the pointer.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
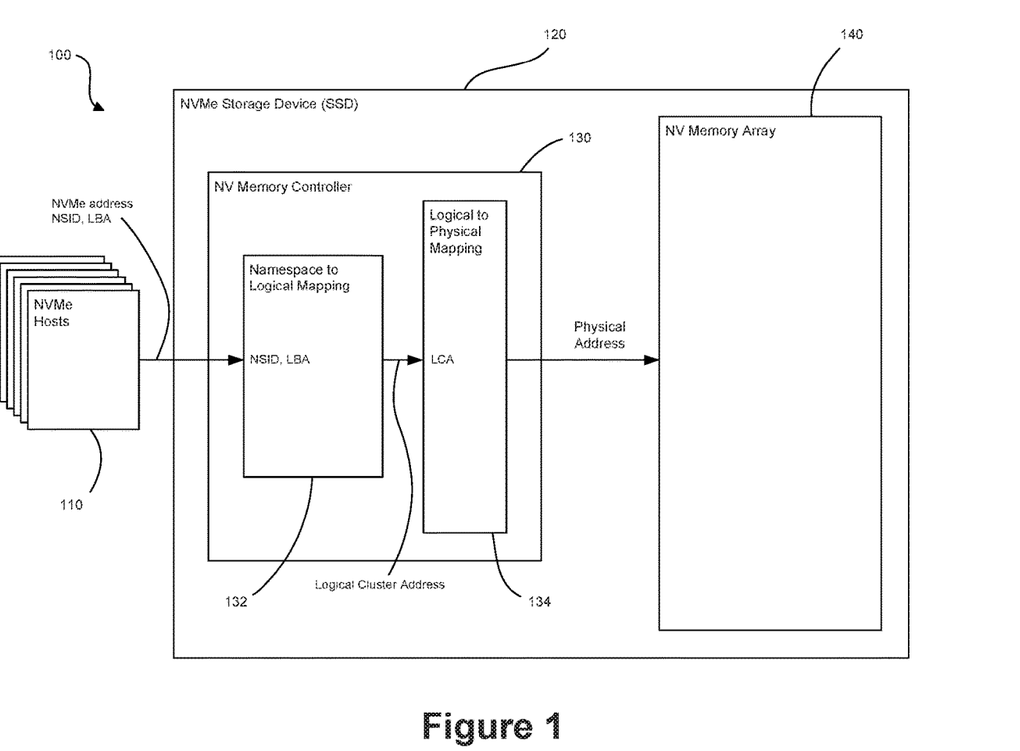
FIG. 1 shows a schematic representation of a solid-state drive (SSD), configured according to one or more embodiments of the present disclosure.

FIG. 1 is a block diagram of a computing system 100 comprising at least one NVMe™ host 110 in communication with a storage device 120. The NVMe™ host 110 is a computing system that comprises processors, memory, and other components as is generally known and is not shown in FIG. 1 for the sake of brevity. Storage device 120 provides nonvolatile storage functionality for use by the host 110. Storage device 120 is a solid-state drive ("SSD"), which is a nonvolatile storage device that includes nonvolatile semiconductor-based storage elements (such as NAND-based flash memory) as the storage medium. Storage device 120 includes a nonvolatile (NV) memory controller 130, and a nonvolatile (NV) semiconductor memory 140. Storage device 120 may also include other elements not shown, such as volatile memory for caching and buffering, power supply circuitry (including circuitry for transferring power to the SSD controller 130, and NV semiconductor memory 140 as well as capacitors for buffering the power supply), indicator light circuitry, temperature sensors, boot circuitry, clock circuitry, and other circuitry for assisting with various functions.

SSD controller 130 receives and processes commands from the host 110 in order to perform operations on the NV semiconductor memory 140. Commands from host 110 include requests to read or write to locations within the NV semiconductor memory 140, and various administrative commands, such as commands for querying the feature set of storage device 120, commands for formatting the NV semiconductor memory 140, commands for creating and modifying various types of queues, commands for requesting notification of various events, and various other commands. NV semiconductor memory 140 includes one or more arrays of nonvolatile semiconductor-based storage elements, some examples of which include nonvolatile NAND flash memory, nonvolatile NOR flash memory, nonvolatile DRAM based memory (NVDIMM), magnetoresistive and resistive random-access memory (MRAM and ReRAM), phase change memory (PCM), and other types of memory.

To access data stored in the NV semiconductor memory 140, the host 110 provides a command and a logical address to the SSD controller 130 which then translates the logical address to a physical address prior to reading data from the NV memory array 140. The NV memory array 140 then returns the requested data to the host 110. In accordance with the present disclosure, the SSD controller 130 adopts a two-stage protocol to translate the logical address specified by the host 110 to the physical address in NV memory 140 storing the requested data, as will be detailed in the following sections.

Data is stored in the storage device 120 according to an NVMe™ standard which specifies the use of namespaces. NVMe™ (NVMe™ is an acronym for "NVM express," where "NVM" stands for "nonvolatile memory") is a standard for accessing solid state drives (SSDs) through a PCIe™ ("Peripheral Component Interface Express") bus. Among other features, NVMe™ specifies that data stored in an SSD may be logically organized into subdivisions referred to as namespaces. The use of namespaces means that logical addresses provided by a host 110 to an SSD controller 130 include a namespace identifier (NSID), which identifies a namespace (and can be, for example, a short sequence of bits), in addition to a logical block address (LBA), which identifies a logical block within that namespace. LBAs for a given namespace are restricted to a range 0 to N−1, where N is the size of the namespace defined at the time it created.

Figure 2:
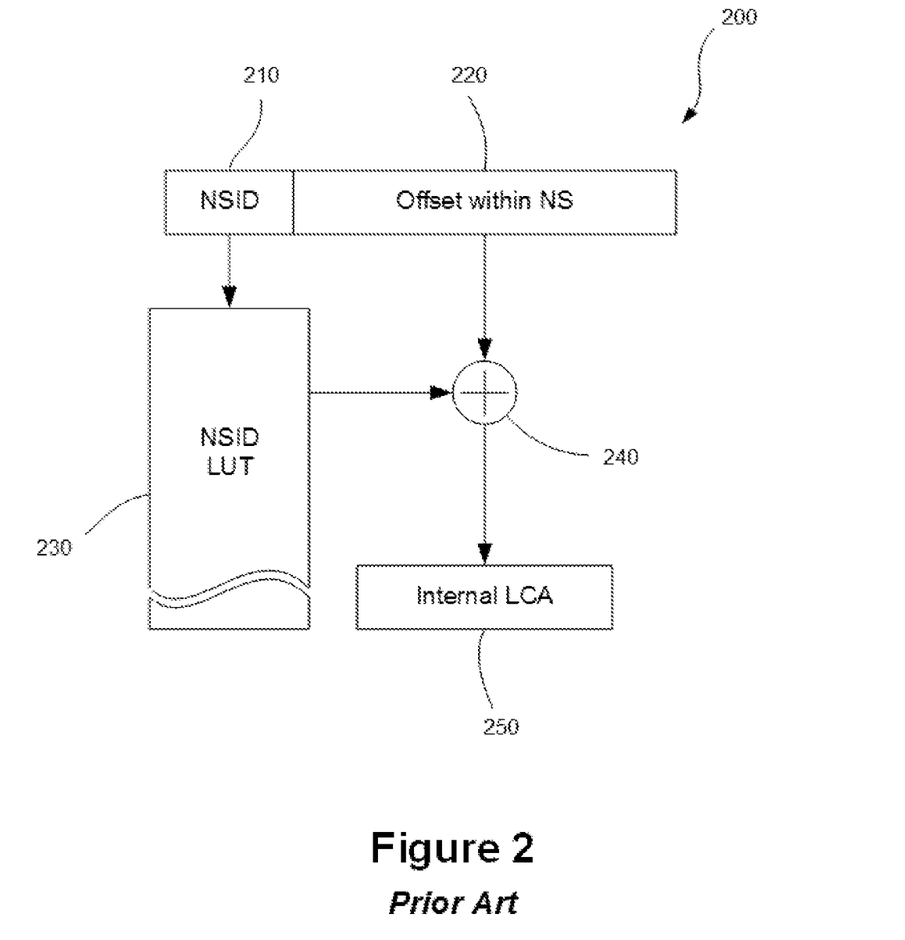
FIG. 2 illustrates a conventional technique for converting namespace addresses to internal logical cluster addresses.

The use of namespaces according to the NVMe™ standard is illustrated in FIG. 2, as an example. FIG. 2 graphically illustrates an address space 200 associated with namespace-based addressing. An address in the address space includes the namespace identifier NSID 210 and a logical address 220 within the namespace (also referred to as an offset or an offset within the namespace). The logical address 220 is the LBA. The term "offset" may also be used to specify a particular subdivision of a namespace that has a different size than a block. For example, an offset may specify the location of a "segment," which has a size less than or equal to the size of a block or the location of a "cluster" which has a size less than or equal to the size of a segment. Within each namespace identified by the NSID 210, the LBAs 220 begin at zero and increase linearly. The namespace-based address space therefore includes multiple sets of numbers that each begin at zero and then linearly increase, as the offsets in each namespace begin at zero. In order for an SSD controller to navigate these multiple sets of numbers, namespace allocation unit look-up tables (NSAU LUTs) are used to translate a LBA specified in a namespace to a physical address.

Instead of using namespace-based addresses as indexes to logical-to-physical lookup tables, SSD controller 130 first converts the namespace-based address to a linear, internal address, termed a logical cluster address (LCA), using the NSID and uses the LCA as an index to a logical-to-physical lookup table. Within the linear address space that is associated with the NSID, the namespaces are arrayed in a back-to-back manner, so that the NSID corresponding to one namespace are adjacent to the NSID corresponding to the subsequent namespace. This effectively converts the namespace-based address space into an address space that includes a single set of numbers that begin at 0 and increase to a maximum number. The use of the NSID allows for efficient indexing of a logical-to-physical conversion table.

FIG. 2 illustrates a technique for converting namespace-based addresses to LCAs. These addresses are "internal" because while SSD controller 130 uses such addresses, these addresses are not visible to the host 110, which instead uses the namespace-based addresses to access data stored in NV memory 140. Here the NSID 210 of the namespace address 200 is relayed to an NSID NSAU LUT 230 which converts NSIDs to base addresses in the linear, internal address space. The base address is simply the beginning address of the corresponding namespace within the linear address space. An adder 240 within the SSD controller 130 then adds the base address to the offset portion of the namespace address 200, i.e. the LBA 220, to generate the linear internal LCA address 250.

Figure 3A:
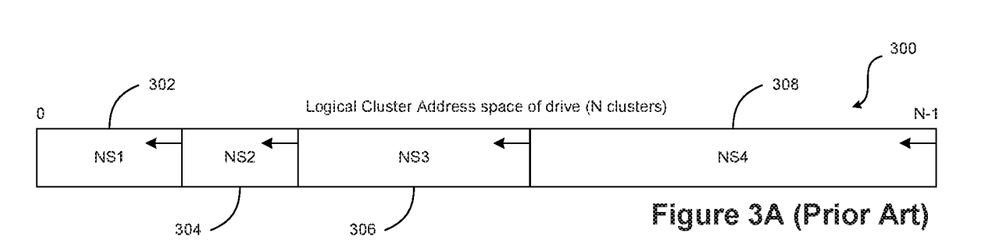
FIG. 3A illustrates a block diagram representation of a fully allocated logical cluster address space according to the prior art.
Figure 3B:
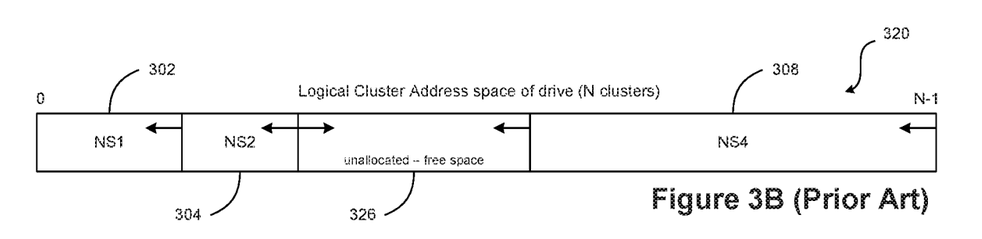
FIG. 3B illustrates a block diagram representation of a partially allocated logical cluster address space according to the prior art.
Figure 3C:
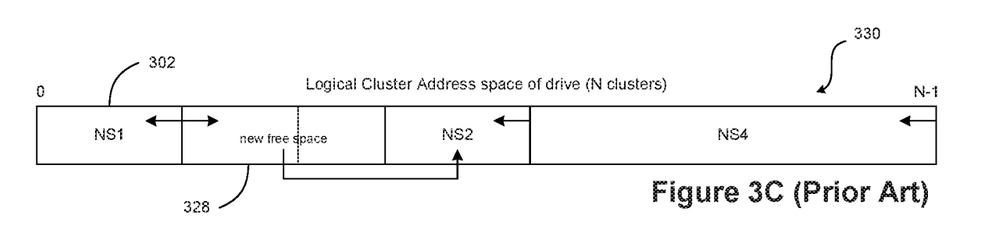
FIG. 3C illustrates a block diagram representation of a partially allocated logical cluster address space according to a fixed translation scheme as is known in the art when a namespace is increased.

FIG. 3A illustrates an exemplary logical cluster address LCA space 300 of an SSD (such as device 120) as is known in the prior art. In this example, the LCA space 300 has been divided into N parts or clusters, allocated to 4 namespaces: NS1 302, NS2 304, NS3 306 and NS4 308. The LCA space 300 is linear and starts at 0 and linearly increases towards N−1. As the clusters allocated to namespaces NS1-NS4 span the entire address space 300, the LCAs are fully allocated. Any re-sizing of namespace address ranges can only be done by means of namespace decreases (shown as left facing arrows on the rightmost boundary of the namespaces) and/or deletions from the LCA. FIG. 3B shows an LCA address space 320 similar to that shown in FIG. 3A, after the clusters allocated to namespace NS3 306 have been deleted. In this case the LCA space 320 is partially allocated and contains unallocated clusters 326. Such unallocated clusters 326 enable the enlargement of the LCA ranges of namespaces adjacent to the unallocated clusters (shown by a right facing arrow on the rightmost boundary of the LCA range of the namespaces), such as an increase in LCAs allocated to NS2 304 as the LCAs adjacent to NS2 304 are unallocated. FIG. 3C shows an LCA address space 330 similar to that shown in FIG. 3B with namespace NS3 306 deleted and namespace NS2 moved to the upper region of free space left by NS3, thereby giving rise to unallocated clusters in the new free space 328 in its place. This is due to the fact that in FIG. 3B, an enlargement of the LCA range of namespace NS1 302 is not possible as the last allocated (rightmost) cluster of namespace NS1 302 is not adjacent to the unallocated clusters 326. In this case, the data in cluster NS2 304 has to be moved to free up clusters adjacent to cluster NS1 302 so as to enable the increase in size of NS1. As shown in FIG. 3C, the data in cluster NS2 304 is moved to the unallocated clusters 326 once occupied by NS3 306, after which namespace NS1 302 can be increased in size. It will be understood that the data in NS2 304 can only be moved if the unallocated clusters 326 are of sufficient size for the namespace NS2 304 to move into. Such enlargement of namespaces requires movement of data which is inefficient and may result in corruption or even loss of data.

Figure 4A:
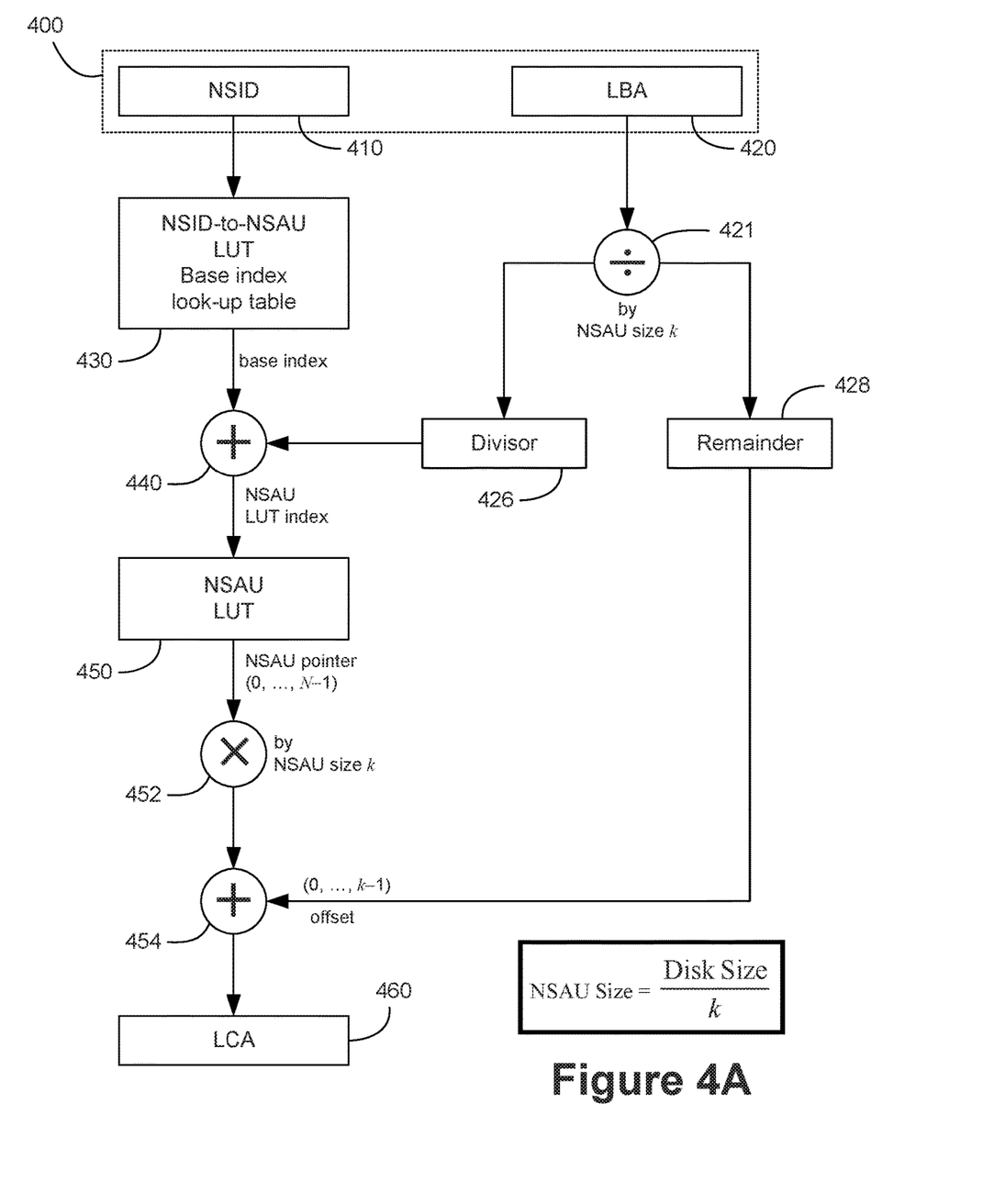
FIG. 4A shows a schematic representation of the conversion of namespace addresses to internal logical cluster addresses for a general namespace address size using an indirect translation scheme according to an embodiment of the present disclosure.

FIG. 4A illustrates a namespace address (NSA) 400 according to an embodiment of the present disclosure. In FIG. 4A, the NSA 400 has a general size. The namespace address 400 comprises a namespace identifier NSID 410 and an m-bit sector logical block address (SLBA) 420. The NSID 410 may span 5-bits and the SLBA 420 may span 64-bits, however these are merely illustrative and the NSID 410 and the SLBA 420 can each span any length. Translation of a namespace address by the NVMe™ SSD 120 received from a host device 110 will now be described in relation to FIG. 4A. When the NVMe™ SSD 120 receives a namespace address 400 from a host 110, the NSID 410 is translated into a namespace base index via lookup table 430 by the namespace-to-logical mapping unit 132 of the NVMe™ controller 130. In an exemplary embodiment, lookup table 430 is implemented as a 32 entry 10-bit LUT, however any size LUT can be used. At the same time, the LBA 420 is processed arithmetically where it is arithmetically divided by the size of a namespace allocation unit k of the SSD 110. This division is performed by an operator 421 in the controller 130. For example, the SSD memory may be partitioned into 100 parts (this is a granularity that is pre-set at the time of initialization of the SSD). Thus, for example, for an SSD having a total of 5,000 clusters, each namespace part of the SSD will contain 50 clusters. This is the size k of each NSAU. The division of the LBA by operator 421 yields a divisor 426 and a remainder 428. As will be understood, the remainder may be zero in some cases. The controller 130 then adds the base index to the divisor 426 using an arithmetic adder 440 to generate an entry in an NSAU LUT 450. This lookup table 450 contains pointers to the LCA space of the SSD 110. Operator 452 of the controller 130 multiplies the entry in the NSAU LUT 450 by the NSAU size k, after which the resulting number is added to the remainder 428 from the arithmetic division of the LBA 420 by operator 454. This generates the logical cluster address 460 as shown in FIG. 4A. Here the remainder 428 from the arithmetic division of the LBA 420 is treated as an offset in the LCA space, as will be explained in relation to FIG. 5 below.

Figure 4B:
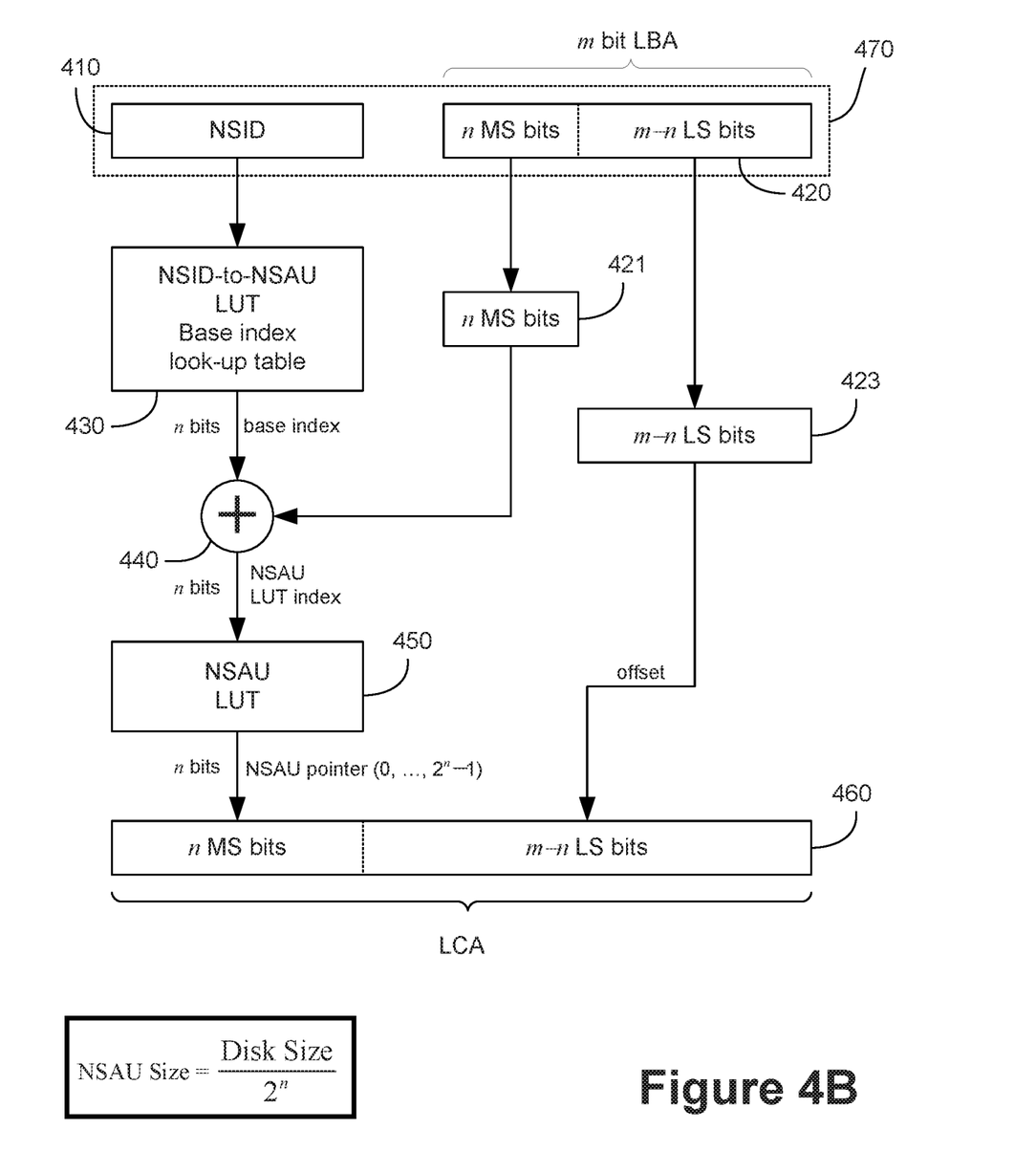
FIG. 4B shows a schematic representation of the conversion of namespace addresses to internal logical cluster addresses for a specific namespace address size using an indirect translation scheme according to an embodiment of the present disclosure.

FIG. 4B illustrates the translation of a namespace address 470 according to an embodiment of the present disclosure similar to that described in relation to FIG. 4A except that the namespace address 470 has a specific size of $2^n$. The translation in FIG. 4B predominantly differs from that described in FIG. 4A in the processing of the LBA 420. As in FIG. 4A, the namespace address 470 comprises a namespace identifier NSID 410 and an m-bit SLBA 420, where the SLBA comprises n most significant (MS) bits and m-n least significant (LS) bits. When the NVMe™ SSD 120 receives a namespace address 470 from a host 110, the NSID 410 is translated into a namespace base index via lookup table 430 by the namespace-to-logical mapping unit 132 of the NVMe™ controller 130. In an exemplary embodiment, lookup table 430 is implemented as an n-bit LUT. The controller 130 then arithmetically adds the MS bits 421 of the LBA 420 to the base index to generate an entry in an NSAU LUT 450. This table 450 contains NSAU pointers to the LCA space of the SSD 110, each of which comprises n bits. The controller 130 uses the n-bit NSAU pointer from the NSAU LUT 450 and the m-n LS bits 423 of the n-bit LBA 470 to generate the logical cluster address 460 as shown in FIG. 4B. Here the m-n LS bits 423 of the n-bit LBA 470 is used as an offset in the LCA space, as will be explained in relation to FIG. 5 below.

Figure 5:
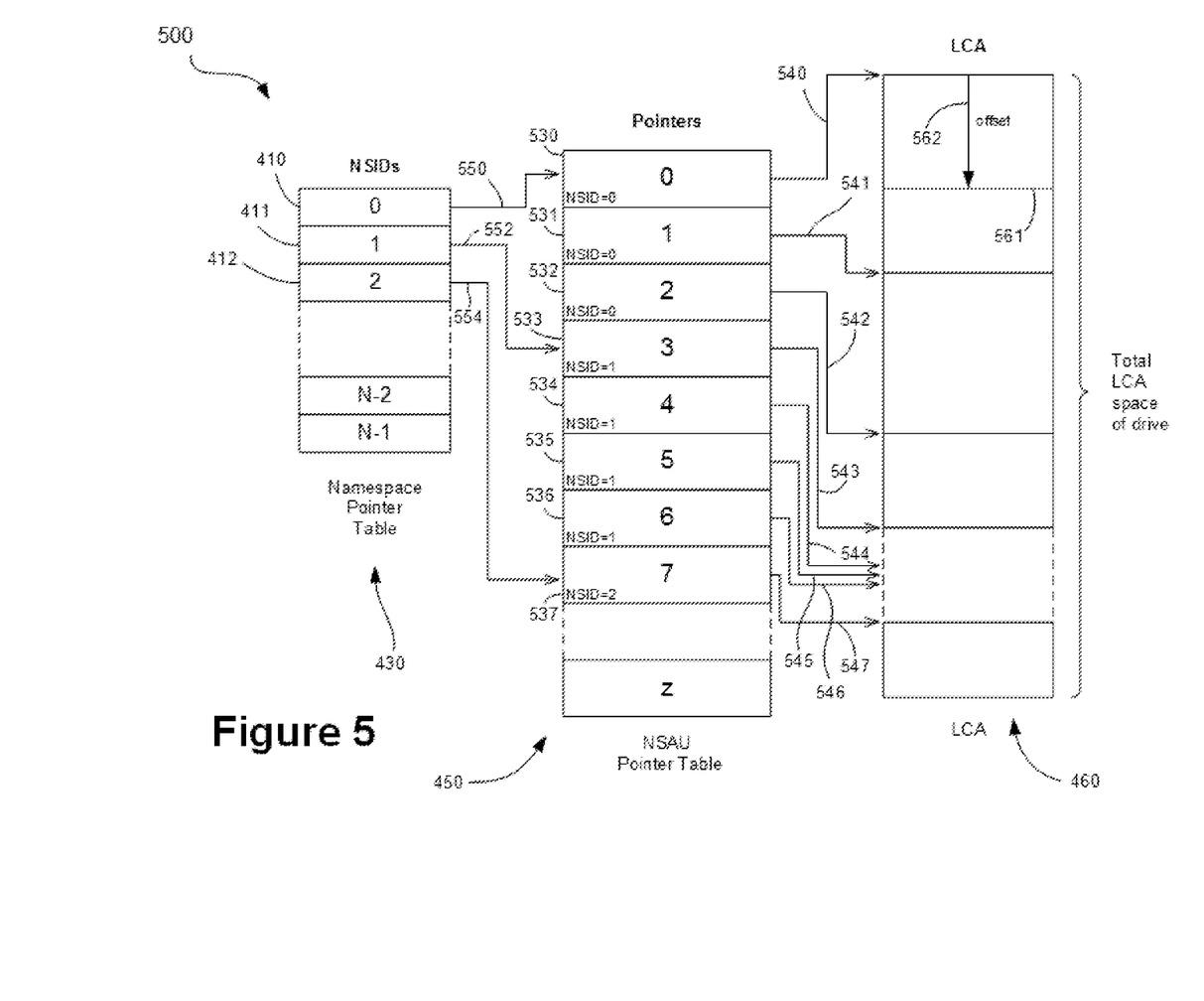
FIG. 5 illustrates the mapping of pointers using the indirect translation scheme of FIG. 4A.

The two stage translation process for a generic NSA is illustrated in the block diagram 500 of FIG. 5 where an LCA is generated from an NSID and LBA as received from a host 120. The NSID 410 is translated into a base index via the namespace pointer LUT 430. This is done by the namespace-to-logical mapping unit 132 of the NVMe™ controller 130. This is shown in FIG. 5 where NSID 410 is mapped to NSAU pointer 530 in the NSAU LUT 450 via pointer 550. The LUT 430 also shows NSIDs 411 and 412 where these are translated into respective base indexes via LUT 430 where NSID 411 is mapped to NSAU pointer 533 via pointer 552 and NSID 412 is mapped to NSAU pointer 537 via pointer 554. As discussed in relation to FIG. 4A, this mapping involves the arithmetic summation of the respective base indexes and the divisor 426 from the LBA once divided by the size k of the NSAU of the SSD. The NSAU pointers 530-537 in the NSAU LUT 450 of FIG. 5 are obtained using this method. Each of the NSAU pointers 530-537 in NSAU LUT 450 are processed by the logical-to-physical mapping unit 134 of the NVMe™ controller 130. As mentioned, the controller 130 multiplies the entry in the NSAU LUT 450 by the NSAU size k, after which the resulting number is added to the remainder 428 from the arithmetic division of the LBA 420 by operator 421. As previously mentioned the remainder 428 is treated as an offset 562 and is visually represented in FIG. 5. Here the LCA 460 resulting from the multiplication of the NSAU pointer by the NSAU size k is illustrated as LCA start address 540 (for NSID 410). The remainder 428 is implemented as the offset 562 which adds to the LCA start address to give the specific LCA address 561 as shown in FIG. 5. Similarly, the LCA 460 resulting from the multiplication of the respective NSAU pointers 531-537 by the respective NSAU size is illustrated in FIG. 5 as LCA start address 541-547.

The foregoing namespace translation scheme will now be explained with a few numerical examples. Assuming a disk size of 5,000 clusters where the disk has been divided into 100 parts (i.e. a granulation factor of 100), the NSAU size k would be 50 clusters, i.e. the size of each part (namespace allocation unit) will be 50 clusters.

To create a namespace with NSID '0' which occupies 140 clusters, the number of NSAUs required would be 140÷50=2 with a remainder of 40, i.e. NSID '0' would occupy 3 namespaces, the first two NSAUs being fully used and the final NSAU being partially used with 10 unallocated clusters. Thus the entries in NSAU pointer LUT 450 would be {0, 1, 2, x, x, . . . , z} where 'x' is an unset value and z is the maximum number of NSAUs available (in this example z is 100). These entries in the NSAU LUT 450 indicate that the first three pointers 530-532 are used by NSID '0', where the final NSAU corresponding to pointer 532 would be partially used with 10 unallocated clusters (the remainder 40 would use up 40 clusters of the 50 clusters in an NSAU leaving 10 unallocated). In this case the NSID pointer table entry 410 for pointing NSID '0' to NSAU pointer '0' in the NSAU LUT 450 (as indicated by pointer 550 in FIG. 5) would be {0, x, x, x, . . . }. This means that the NSID '0' has a first starting base index value that corresponds to pointer '0' in the (0+1)th entry, i.e. first entry, of the NSAU LUT 450.

Similarly, with NSID '0' created as above, to create a namespace with NSID '1' which occupies 200 clusters, the number of NSAUs required would be 200÷50=4 with no remainder. Here NSID '1' would fully occupy four NSAUs. The entries in the NSAU pointer LUT 450 would now be {0, 1, 2, 3, 4, 5, 6, x, ..., z}, where the NSAU pointers {0, 1, 2} are used by NSID '0' as previously discussed and the NSAU pointers {3, 4, 5, 6} are used by NSID '1'. The NSID pointer table entry 411 for pointing NSID '1' to NSAU pointer '3' in the NSAU LUT 450 (as indicated by pointer 552 in FIG. 5) would be {0, 3, x, x, ...}. This means that the NSID '1' has a first starting base index value that corresponds to pointer '3' in the (3+1)th entry, i.e. fourth entry, of the NSAU LUT 450.

Further, in addition to NSIDs '0' and '1' as described previously, to create another namespace with NSID '2' which occupies 37 clusters, the number of NSAUs required would be 37÷50=1 with a remainder of 13, i.e. NSID '2' would only occupy one NSAU which would be partially used (having 13 unused clusters). The entries in the NSAU pointer LUT 450 would now be {0, 1, 2, 3, 4, 5, 6, 7, ..., z}, where the NSAU pointers {0, 1, 2} are used by NSID '0' and {3, 4, 5, 6} are used by NSID '1' as previously discussed, and the NSAU pointers {7} is used by NSID '2'. The NSID pointer table entry 412 for pointing NSID '2' to NSAU pointer '7' in the NSAU LUT 450 (as indicated by pointer 554 in FIG. 5) would be {0, 3, 7, x, ...}. This means that the NSID '2' has a first starting base index value that corresponds to pointer '7' in the (7+1)th entry, i.e. eighth entry, of the NSAU LUT 450.

To build on the above numerical example, when a read command is received from a host 110 to read 23 clusters from NSID '1' and LCA=137, for example, the NSID pointer table 430 entry 411 is read to obtain the start pointer corresponding to NSID '1'. A pointer to entry '3' in the NSAU LUT 450 would be obtained. According to the scheme in FIG. 4A, the LCA received from the host 110 is divided by the NSAU size, i.e. 137÷50=2 remainder 37. The divisor is then added to the entry '3' in the NSAU LUT 450, i.e. 3+2=5, after which the entry '5' in the NSAU LUT 450 is read. As the NSAU size in this example in 50, entry '5' could correspond to clusters starting at 250. This is indicated by pointer 545 in FIG. 5 which maps entry '5' in the NSAU LUT 450 to the LCA space 460. The remainder 37 is then added to the starting cluster value 250 to give an LCA address of 250+37=287 in the LCA space 460. This LCA contains the pointer to the start of the data in the physical memory that the hosts requires.

In a further numerical example, if a host requires an increase in the NSA corresponding to NSID '0' by 40 clusters, for example, the additional number of NSAUs required for this operation is 1. Recall that NSID '0' already has 140 clusters that spans 3 NSAUs 530-523, the last of which is partially filled. With 40 additional clusters, the total number of clusters for NSID '0' is now 180, which gives a 180÷50=3 remainder 30. Thus the new NSID '0' will occupy 4 NSAUs, which is an increase by one NSAU, the last of these 4 NSAUs will be partially used as the remainder 30 is less than k. The controller 130 then checks if there are unallocated NSAUs (from the maximum of z=100). If there are unallocated NSAUs, the NSAU pointer LUT 450 is re-ordered so as to create 1 free entry at the end of the entries corresponding to NSID '1' so that all entries in the NSAU LUT 450 with the same NSID are contiguous. This re-ordering of the NSAU LUT 450 is critical when an increase in NSA is requested by a host. In the case for an increase in NSA corresponding to NSID '0', the unallocated entry in the re-ordered NSAU LUT 450 would be reflected in the entries in the NSAU LUT 450 as {0, 1, 2, x, 3, 4, 5, 6, 7, ..., z}, x denoting an unallocated NSAU. The entries in the NSID pointer table 430 are then updated from {0, 3, 7, x} to {0, 4, 8, x} to cater to the unallocated entry in the re-ordered NSAU LUT 450. The new entry is then inserted into the NSAU pointer table 450 for the new NSAU to increase the NSA for NSID '0'. The updated NSAU pointer table 450 is {0, 1, 2, 8, 3, 4, 5, 6, 7, ..., z}, where 8 corresponds to clusters 351 to 400. It can be seen that while the pointers in NSAU LUT are ordered in a contiguous manner where like NSIDs are grouped together, the logical cluster address to which the pointers in the NSAU LUT point to do not need to be ordered. In this case the NSAU pointer table 450 is {0, 1, 2, 8, 3, 4, 5, 6, 7, ..., z}, where the starting address for the increased LCA space for NSID '0' is {0, 50, 100, 750}, the starting address for the LCA space for NSID '1' is {150, 200, 250, 300}, and the starting address for the LCA space for NSID '2' is {350}. Here the starting address for the LCA for the new NSAU with NSID '0' is 750, which is not contiguous with the other NSAUs for NSID '0' which are {0, 50, 100}. This illustrates the dynamic nature of the present disclosure where increases in namespaces can be easily achieved without the need to re-locate data (as previously shown in FIG. 3A-3C).

Figure 6:
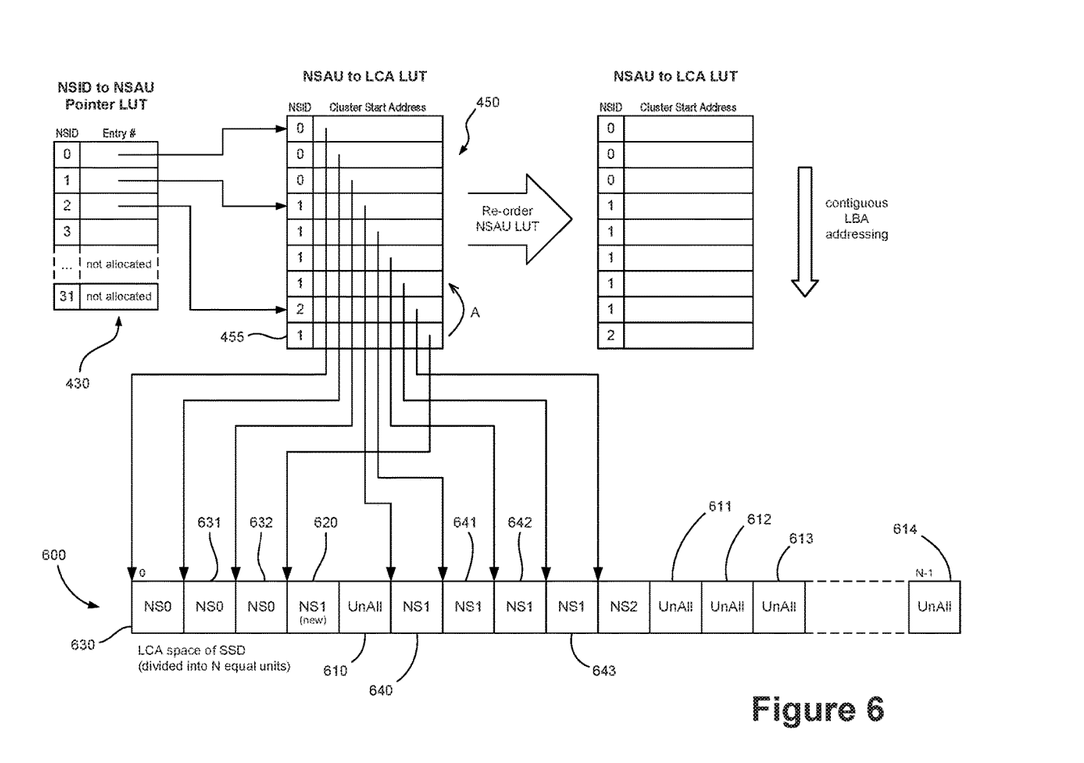
FIG. 6 illustrates the increase of the size of a namespace using an indirect translation scheme according to an embodiment of the present disclosure.

A manner of increasing a namespace will now be described with respect to FIG. 6 which shows the enlargement of an NSA with NSID '1'. A new NSID entry 455 is added to the NSAU LUT table 450. This new entry 455 may be created by the SSD 120 in response to a command from one of the hosts 110 requesting an increase in the size of the namespace with NSID '1'. The NSAU LUT entry 455 is added to the very end of the NSAU LUT 450, as shown in FIG. 6. After the addition, the NSAU LUT 450 is re-ordered to ensure a contiguous order of NSIDs, where the LCA pointer corresponding to the new NSAU entry 455 is moved to be the very last LCA pointer entry in the NSAU LUT with pointers having NSID '1'. This is seen in FIG. 6 where the LCA pointer corresponding to the new NSID entry 455 is moved up within the NSAU LUT 450 as indicated by arrow A. The controller 130 also determines if there are any unallocated groups of clusters in the LCA space 600. Such cluster groups are termed unallocated namespace allocation units (NSAUs) such as NSAU 610-614 in FIG. 6. As shown, the controller has assigned an unallocated NSAU 620 from the unallocated NSAU pool to the LCA pointer corresponding to the newly added NSID 455. This assignment of an NSID to an unused NSAU in the LCA space 600 need not be in an ordered manner as is seen in FIG. 6 where the new NSAU entry 455 points to a new NSAU 620 with NSID '1' placed adjacent to NSAUs with NSID '0' 630-632 and separated from the existing NSAUs with NSID '1' 640-643. While the clusters allocated to a namespace need not be contiguous (or indeed arranged in any particular order) in the LCA space 600, the NSAU LUT table entries for the namespace do need to be in contiguous order of NSID, hence the need to re-order NSAU LUT after increasing the size of a namespace. As previously mentioned, this re-ordering of NSAU pointers according to NSID in the NSAU LUT 450 does not require any movement of data as only the NSID and corresponding pointers to the LCA space that get re-arranged.

Figure 7:
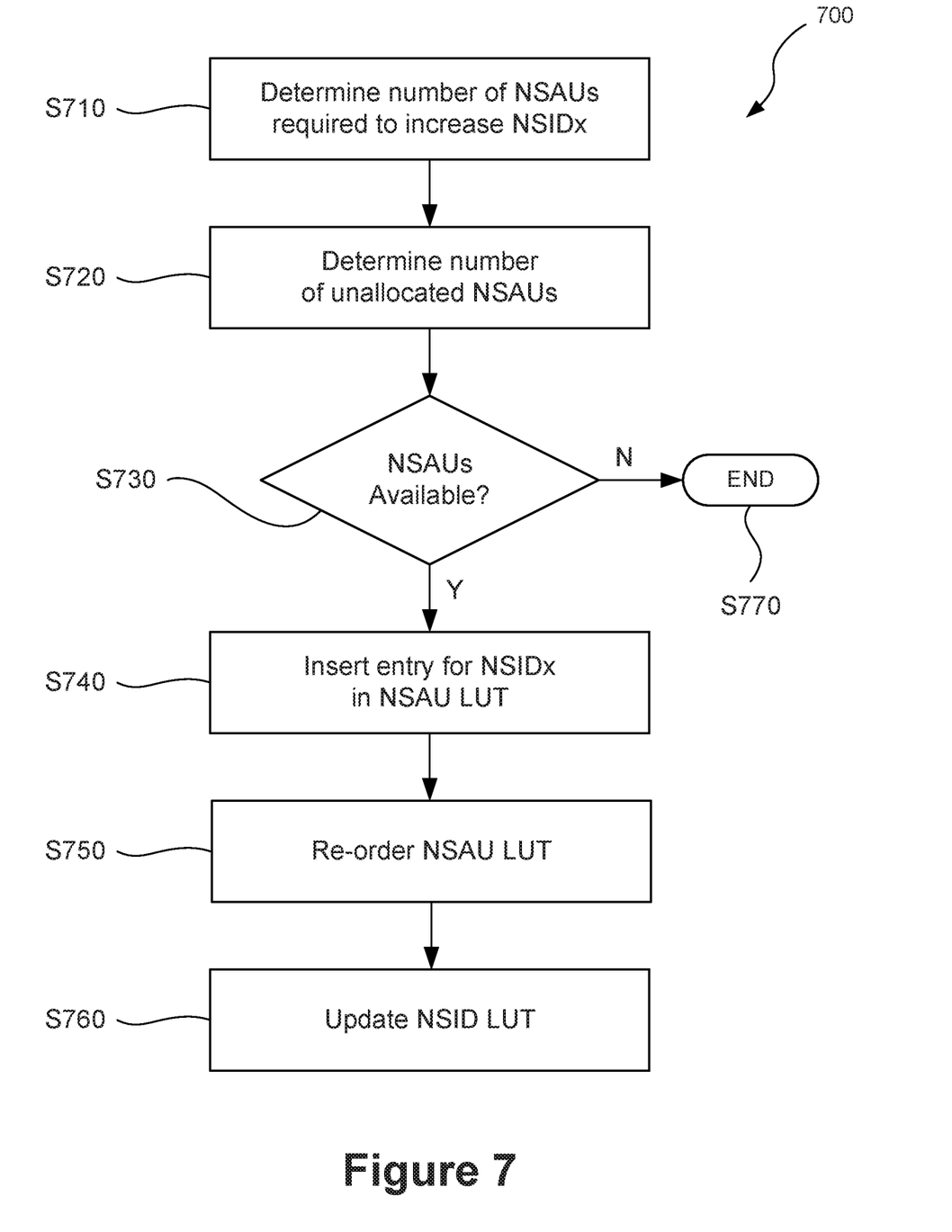
FIG. 7 is a flow diagram of method steps for increasing the size a namespace using an indirect translation scheme according to an embodiment of the present disclosure.

A method 700 of increasing a namespace is shown in FIG. 7. Upon receipt of a command from a host 110 to increase the size of the NSA for a namespace NSIDx, the controller 130 determines the number of NSAUs required for such an increase in step S710. This is done by dividing the LCA provided by the host by the granularity k of the SSD. Next in step S720, the controller determines the number of unallocated NSAUs available in the LCA space. The controller then determines if the number of unallocated NSAUs in the LCA space is greater than or equal to the number of NSAUs required to increase the NSA as required by the host (step S730). If the number of unallocated NSAUs in the LCA space is greater than or equal to the number of NSAUs required, the controller creates a new entry in the NSAU LUT 450 for NSIDx in step S740. This new entry in the NSAU LUT 450 is added as the very last entry in the NSAU LUT 450. The NSAU LUT 450 is then re-ordered in step S750 such that the new entry for NSIDx is contiguous with other entries that correspond to NSIDx in the NSAU LUT 450. For example when a host requires an increase in namespace NSID '1', a new entry is inserted in the NSAU LUT 450, after which the NSAU LUT is re-ordered according to NSID where all entries with similar NSID are arranged adjacent each other in the NSAU LUT. After re-ordering the new entry is placed as the very last entry within the entries in the NSAU LUT 450 having similar NSID '1'. The controller 130 then updates the NSID LUT 430 to reflect the new starting NSAU for each NSID, as shown in step S760. Following S760, the controller then associates a pointer in the new entry of the NSAU LET 450 with the unallocated NSAUs in the LCA space 600. If there is a plurality of unallocated NSAUs in the LCA space 600, the assignment of an unallocated NSAU in the LCA space 600 may not be in any particular order. If at step S730 no unallocated NSAUs are available, the SSD 110 does not increase the size of the namespace and the host 110 is informed by means of an error response, for example, after which the method 700 ends (step S770).

Figure 8:
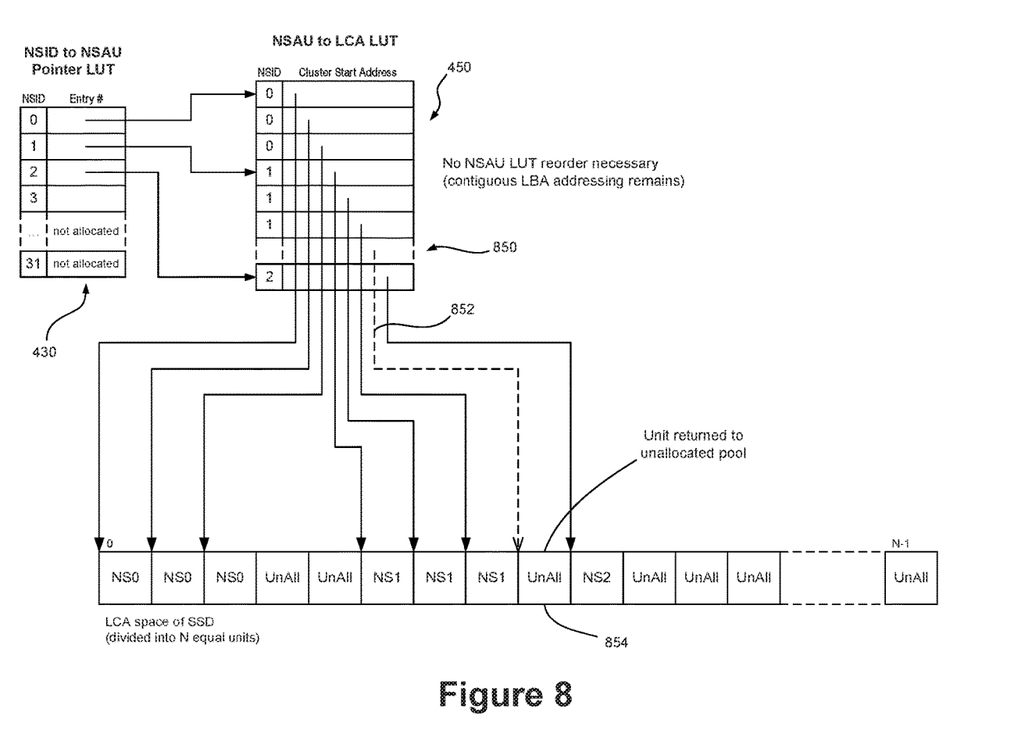
FIG. 8 illustrates the decrease of the size of a namespace using an indirect translation scheme according to an embodiment of the present disclosure.

FIG. 8 illustrates a manner of decreasing the namespace according an implementation of the present disclosure. Here an NSAU entry 850 in NSAU LUT 450 is removed following a command received by the SSD 120 from a host 110 for namespace resizing. Prior to receiving such a command, NSAU 850 corresponded to an LCA pointer 852 that mapped to an NSAU cluster 854 in the LCA space. Once NSAU entry 850 is removed, pointer 852 to NSAU 854 is also removed from the NSAU LUT 450, and the status of that cluster is updated to unallocated. Unallocated NSAU 854 then forms part of the unallocated NSAU pool and becomes available for assignment should a namespace be added as in FIGS. 6 and 7. It should be noted that unlike an increase in namespace, after the pointer is removed from the NSAU LUT 450, no re-ordering of the NSAU LUT is necessary. The NSID LUT 430 also need not be updated if the NSAU entry 850 is not the only entry in the NSAU LUT 450 for that NSID. However if the re-size request from the host relates to the deletion of an entry in the NSAU LUT where that entry is the only entry with that NSID, the NSID LUT 430 may be updated to reflect that there is no start address for that NSID.

Figure 9:
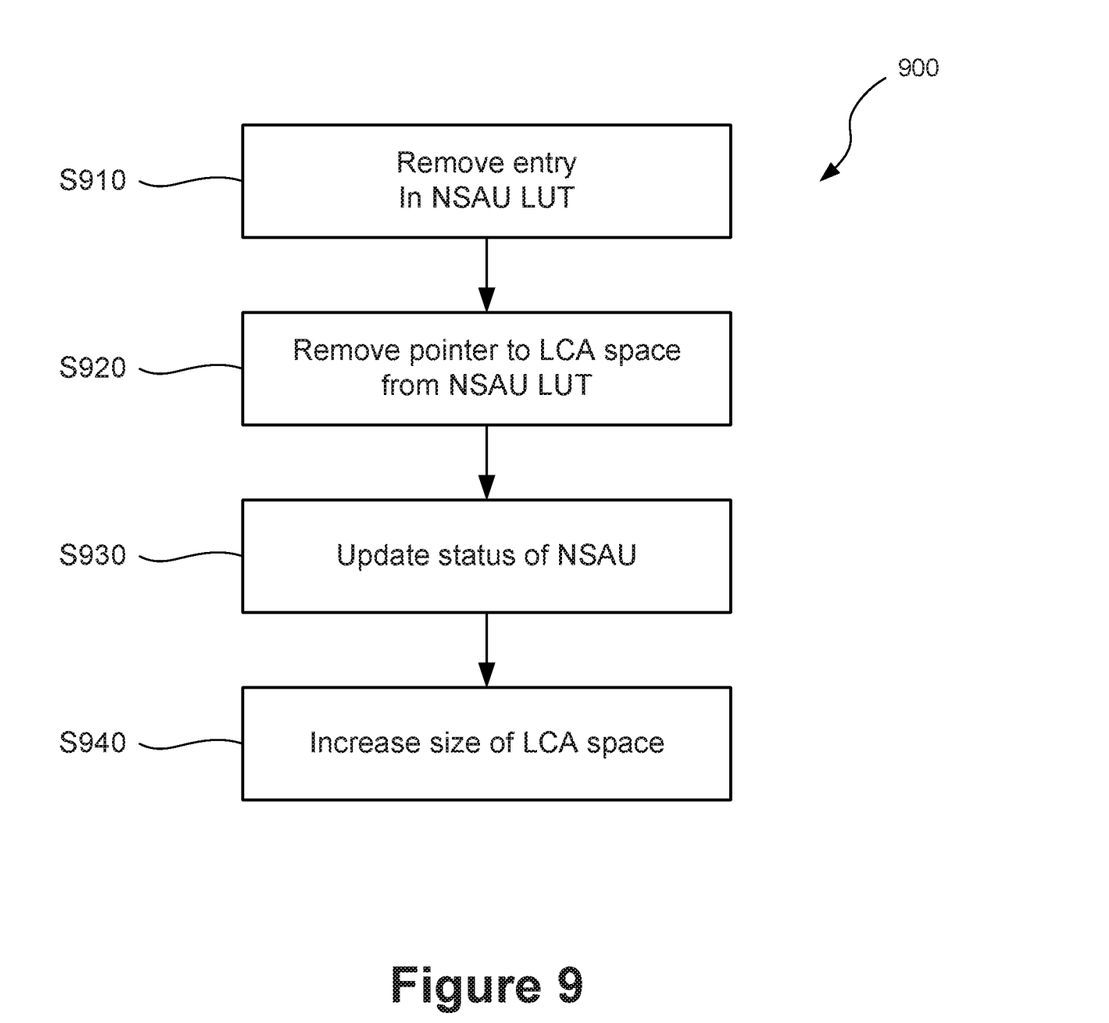
FIG. 9 is a flow diagram of method steps for decreasing the size of a namespace using an indirect translation scheme according to an embodiment of the present disclosure.

A method 900 of decreasing a namespace size is illustrated in FIG. 9. The method 900 starts by removing the NSAU entry from the NSAU LUT 450 in step S910. The LCA pointer 852 to NSAU 854 is then removed from the NSAU LUT 450 (in step S920). The status of the NSAU cluster 854 is then updated to "unallocated" in step S930, and the size of the available "unallocated" LCA space is then increased by one indicating the addition of an unallocated NSAU to the unallocated cluster pool (step S940).

Figure 10:
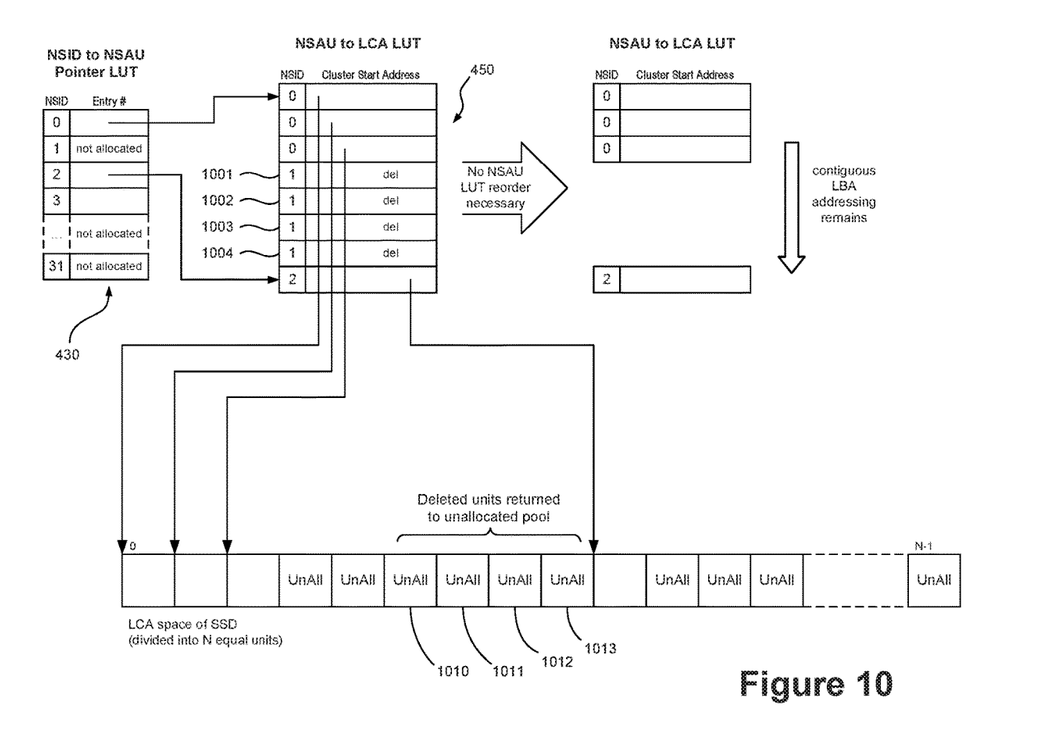
FIG. 10 illustrates the deletion of a namespace using an indirect translation scheme according to an embodiment of the present disclosure.

FIG. 10 illustrates the deletion of at least one namespace in a manner similar to that of FIG. 8. In FIG. 10, NSAUs corresponding to NSID=1 have been marked for deletion by the controller 130. Prior to such a deletion request, NSAU pointers 1001-1004 corresponded to NSAUs 1010-1013. After deletion of NSAU LUT entries 1001-1004, the pointers in the NSAU LUT 450 are removed, and the status of NSAUs 1010-1013 is updated to "unallocated". These clusters then form part of the unallocated NSAU pool and become available for assignment. As with the method of decreasing the namespace size, after the pointers are removed from the NSAU LUT 450, no re-ordering of the NSAU LUT is necessary since all the remaining NSAU LUT entries for the remaining NSIDs are still in order.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

We claim:

1. A data storage device comprising:
a nonvolatile semiconductor storage device configured to store data to be accessed with a plurality of logical addresses each comprising a namespace identifier (NSID) and a logical block address (LBA) having an LBA bit length, the plurality of logical addresses comprises a plurality of NSIDs and a plurality of LBAs; and
a controller configured to:
partition the nonvolatile semiconductor storage device into a plurality of namespace allocation units (NSAUs), wherein each NSAU is associated with an NSID of the plurality of NSIDs, has an NSAU bit length, and is addressable by a cluster start address,
access a first look up table (LUT) comprising an association of the plurality of NSIDs with a plurality of base indices,
determine an index into a single second LUT based on a base index from the plurality of base indices,
access the single second LUT comprising a plurality of associations of the plurality of NSIDs with a plurality of pointers, each pointer corresponding to each of the start addresses of each of the NSAUs, respectively, the plurality of associations corresponding to a plurality of entries in the single second LUT, wherein a size of the single second LUT is as defined by a number of pointers to the NSAUs that are associated with an NSID which the single second LUT holds,
determine, based on the accesses, for each pointer of the plurality of pointers, a logical cluster address that corresponds to an LBA of the plurality of LB As,
increase a size of a namespace associated with an NSID of the plurality of NSIDs by addition of one or more entries to the plurality of entries in the single second LUT; and
re-order the plurality of entries in the single second LUT after such increase.

2. The data storage device of claim 1, wherein the LBA comprises a first portion and a second portion, the first portion having a bit length corresponding to the NSAU bit length and a first value, and the second portion having a second value corresponding to a logical cluster address offset.

3. The data storage device of claim 2, wherein the controller is further configured to:
determine the index into the single second LUT by incrementing the base index by the first value of the first portion.

4. The data storage device of claim 3, wherein the controller is further configured to increment the logical cluster address by the logical cluster address offset.

5. The data storage device of claim 2, wherein the controller is further configured to:
define a plurality of units of storage addressed by the first portion of the LBA,
allocate a subset of the plurality of units of storage to a namespace associated with the NSID corresponding to the LBA, and
add a set of entries to the single second LUT containing the NSID and the start address for each of the subset of the plurality of units of storage.

6. The data storage device of claim 5, wherein the controller is further configured to:
increase the size of the namespace associated with the NSID by allocating additional units of storage from the plurality of units of storage;
add, for each of the additional units of storage, a new entry to the end of the single second LUT, the new entry containing the NSID and the start address of the additional unit of storage; and
re-order the entries in the single second LUT to ensure the new entry is contiguous with the set of entries containing the same NSID.

7. The data storage device of claim 1, wherein the controller is further configured to increase the size of the namespace associated with an NSID of the plurality of NSIDs by:
allocating additional NSAUs to that NSID;
adding, for each of the additional NSAUs, a new entry to the end of the single second LUT, the new entry containing the NSID and a logical pointer to the start address of the additional unit of storage; and
re-ordering the entries in the single second LUT such that the new entry is contiguous with the set of entries containing the same NSID.

8. The data storage device of claim 1, wherein the controller is configured to:
determine a physical address within the nonvolatile semiconductor storage device based on a full cluster address to physical address mapping table.

9. The data storage device of claim 1, wherein the first LUT comprises a plurality of base indices which are indexed by NSIDs.

10. The data storage device of claim 1, wherein the controller is further configured to:
decrease the size of the namespace associated with an NSID by deleting the last entry in the single second LUT containing the NSID and the pointer associated with the NSID.

11. A method comprising:
partitioning, by a controller, a nonvolatile semiconductor storage device into a plurality of namespace allocation units (NSAUs), the device configured to store data to be accessed with a plurality of logical addresses each comprising a namespace identifier (NSID) and a logical block address (LBA) having an LBA bit length such that the plurality of logical addresses comprises a plurality of NSIDs and a plurality of LBAs, wherein each NSAU is associated with an NSID of the plurality of NSIDs, has an NSAU bit length, and is addressable by a cluster start address;
accessing, by the controller, a first look up table (LUT) comprising an association of the plurality of NSIDs with a plurality of base indices, wherein a base index from the plurality of base indices indexes a single second LUT,
determining, by the controller, an index into the single second LUT based on a base index from the plurality of base indices;
accessing, by the controller, the single second LUT comprising a plurality of associations of the plurality of NSIDs with a plurality of pointers, each pointer corresponding to each of the start addresses of each of the NSAUs, respectively, and the plurality of associations corresponding to a plurality of entries in the single second LUT, wherein a size of the single second LUT is as defined by a number of pointers to the NSAUs that are associated with an NSID which the single second LUT holds;
determining, by the controller, based on the accesses, for each pointer of the plurality of pointers, a logical cluster address that corresponds to an LBA of the plurality of LBAs;
increasing a size of a namespace associated with an NSID of the plurality of NSIDs by addition of one or more entries to the plurality of entries in the single second LUT; and
re-ordering the plurality of entries in the single second LUT after such increase.

12. The method of claim 11, wherein the LBA comprises a first portion and a second portion, the first portion having a bit length which is the NSAU bit length and a first value, and the second portion having a second value which is a logical cluster address offset.

13. The method of claim 12, further comprising:
determining the index into the single second LUT by incrementing the base index by the first value of the first portion.

14. The method of claim 13, further comprising:
incrementing the logical cluster address by the logical cluster address offset.

15. The method of claim 11, further comprising:
increasing the size of the namespace associated with an NSID of the plurality of NSIDs by:
allocating additional NSAUs to the NSID;
adding, for each of the additional NSAUs, a new entry to the end of the single second LUT, the new entry containing the NSID and a logical pointer to the start address of the additional unit of storage; and
re-ordering the entries in the single second LUT such that the new entry is contiguous with the set of entries containing the same NSID.

16. The method of claim 11, further comprising:
determining a physical address within the nonvolatile semiconductor storage device based on a full cluster address to physical address mapping table.

17. The method of claim 11, further comprising:
defining a plurality of units of storage addressed by a first portion of the LBA, wherein each LBA comprises the first portion and a second portion, and wherein the base index is formed using the first portion of the LBA, and the cluster address is formed using the second portion of the LBA;
allocating a subset of the plurality of units of storage to a namespace associated with the NSID corresponding to the LBA; and
adding a set of entries to the single second LUT containing the NSID and the first portion of the cluster address for each of the subset of the plurality of units of storage.

18. The method of claim 17, further comprising, when the controller is further configured to increase the size of the namespace associated with the NSID by allocating additional units of storage from the plurality of units of storage:
  adding, for each of the additional units of storage, a new entry to the end of the single second LUT, the new entry containing the NSID and the first portion of the cluster address of the additional unit of storage, and
  re-ordering the entries in the single second LUT to ensure the new entry is contiguous with the set of entries containing the same NSID.

19. The method of claim 11, further comprising:
  decreasing the size of the namespace associated with a NSID by deleting the last entry in the single second LUT containing the NSID and the pointer associated with the NSID.

20. A non-transitory computer-readable medium storing instructions that, when executed by a processor, cause the processor to perform a method comprising:
  partitioning, by a controller, a nonvolatile semiconductor storage device into a plurality of namespace allocation units (NSAUs), the device configured to store data to be accessed with a plurality of logical addresses each comprising a namespace identifier (NSID) and a logical block address (LBA) having an LBA bit length such that the plurality of logical addresses comprises a plurality of NSIDs and a plurality of LBAs, wherein each NSAU is associated with an NSID of the plurality of NSIDs, has an NSAU bit length, and is addressable by a cluster start address;
  accessing, by the controller, a first look up table (LUT) comprising an association of the plurality of NSIDs with a plurality of base indices, wherein a base index from the plurality of base indices indexes a single second LUT;
  determining, by the controller, an index into the single second LUT based on a base index from the plurality of base indices;
  accessing, by the controller, the single second LUT comprising a plurality of associations of the plurality of NSIDs with a plurality of pointers, each pointer corresponding to each of the start addresses of each of the NSAUs, respectively, and the plurality of associations corresponding to a plurality of entries in the single second LUT, wherein a size of the single second LUT is as defined by a number of pointers to the NSAUs that are associated with an NSID which the single second LUT holds;
  determining, by the controller, based on the accesses, for each pointer of the plurality of pointers, a logical cluster address that corresponds to an LBA of the plurality of LB As;
  increasing a size of a namespace associated with an NSID of the plurality of NSIDs by addition of one or more entries to the plurality of entries in the single second LUT; and
  re-ordering the plurality of entries in the single second LUT after such increase.

* * * * *